US012700751B2

(12) United States Patent
Zhang et al.

(10) Patent No.: US 12,700,751 B2
(45) Date of Patent: Aug. 4, 2026

(54) UNINTERRUPTIBLE POWER SUPPLY, CONTROL METHOD AND POWER SUPPLY SYSTEM

(71) Applicant: Vertiv Corporation, Westerville, OH (US)

(72) Inventors: Zhichao Zhang, Shenzen (CN); Wei Xu, Shenzhen (CN); Ping Gong, Shenzhen (CN); Tongxin Chen, Shenzhen (CN)

(73) Assignee: VERTIV CORPORATION, Westerville, OH (US)

( * ) Notice: Subject to any disclaimer, the term of this patent is extended or adjusted under 35 U.S.C. 154(b) by 106 days.

(21) Appl. No.: 18/518,209

(22) Filed: Nov. 22, 2023

(65) Prior Publication Data

US 2024/0405597 A1      Dec. 5, 2024

(30) Foreign Application Priority Data

Jun. 1, 2023      (CN) .......................... 202310644269.2

(51) Int. Cl.
| | |
|---|---|
| *H02J 9/06* | (2006.01) |
| *H02J 7/00* | (2006.01) |
| *H02J 7/34* | (2006.01) |

(52) U.S. Cl.
CPC .............. H02J 9/061 (2013.01); H02J 7/345 (2013.01); H02J 7/865 (2026.01); *H02J 2207/20* (2020.01)

(58) Field of Classification Search
CPC .......... H02J 9/061; H02J 7/0068; H02J 7/345; H02J 2207/20; H02J 7/02; H02J 9/062;
(Continued)

(56) References Cited

U.S. PATENT DOCUMENTS

| | | | | |
|---|---|---|---|---|
| 7,684,222 B2 * | 3/2010 | Paatero | ................... | H02J 9/062 |
| | | | | 363/123 |
| 10,340,733 B2 * | 7/2019 | Shires | ..................... | H02J 9/062 |

(Continued)

FOREIGN PATENT DOCUMENTS

| | | |
|---|---|---|
| EP | 3806301 A1 | 4/2021 |
| WO | 2015185630 A1 | 12/2015 |

OTHER PUBLICATIONS

Extended European Search Report regarding Application No. 23206569.8, dated Jun. 10, 2024.

*Primary Examiner* — Daniel Kessie
*Assistant Examiner* — Brian K Baxter
(74) *Attorney, Agent, or Firm* — Harness, Dickey & Pierce, P.L.C.

(57) ABSTRACT

An uninterruptible power supply, a control method and a power supply system for normally starting the uninterruptible power supply and securing switch devices are provided. The uninterruptible power supply includes a first rectification circuit, a charge-discharge circuit, a bus capacitor, a first switch circuit and a second rectification circuit. The first rectification circuit is connected to the charge-discharge circuit, and is configured to rectify a voltage outputted by the alternating current power supply. The charge-discharge circuit is connected to the bus capacitor, and is configured to charge the bus capacitor after boosting the voltage outputted by the first rectification circuit, until the voltage across the bus capacitor reaches a first voltage. The first switch circuit is connected to the second rectification circuit, and is configured to connect the alternating current power supply to the second rectification circuit. The uninterruptible power supply boosts the voltage through the charge-discharge circuit to reduce the voltage difference between the alternating current power supply and the bus capacitor. Then, the (Continued)

first switch circuit is switched on to normally start the uninterruptible power supply and secure the first switch circuit.

18 Claims, 6 Drawing Sheets

(58) Field of Classification Search
CPC .... H02J 7/342; H02J 7/04; H02J 9/068; H02J 2207/50
See application file for complete search history.

(56) References Cited

U.S. PATENT DOCUMENTS

| | | | | |
|---|---|---|---|---|
| 10,637,279 | B2* | 4/2020 | Heber | H02H 9/045 |
| 10,998,759 | B2* | 5/2021 | Cheng | H02J 1/102 |
| 2005/0213357 | A1* | 9/2005 | Paatero | H02M 5/458 363/95 |
| 2010/0133910 | A1* | 6/2010 | Lai | H02J 9/062 307/66 |
| 2010/0231175 | A1* | 9/2010 | Noda | H02J 7/342 320/162 |
| 2014/0347769 | A1* | 11/2014 | Kanda | H02H 3/16 361/42 |
| 2015/0061395 | A1* | 3/2015 | Yeh | H02J 9/062 307/66 |
| 2015/0103456 | A1* | 4/2015 | Ghisla | H02H 9/02 361/79 |
| 2016/0134160 | A1* | 5/2016 | Schultz | H02J 7/0019 307/77 |
| 2017/0063150 | A1* | 3/2017 | Sakamoto | H02J 7/0013 |
| 2017/0085124 | A1* | 3/2017 | Ho | H02J 7/0068 |
| 2017/0346330 | A1* | 11/2017 | Matsuno | H02J 50/12 |
| 2019/0181677 | A1* | 6/2019 | Toyoda | H02M 3/33584 |
| 2019/0280346 | A1* | 9/2019 | Liao | H02J 9/062 |
| 2021/0111628 | A1* | 4/2021 | Paatero | H02J 9/061 |
| 2022/0399746 | A1* | 12/2022 | Tajima | H02J 9/062 |
| 2023/0299597 | A1* | 9/2023 | Tsai | H02J 7/00038 320/134 |
| 2024/0195209 | A1* | 6/2024 | Zhang | H02J 9/062 |

* cited by examiner

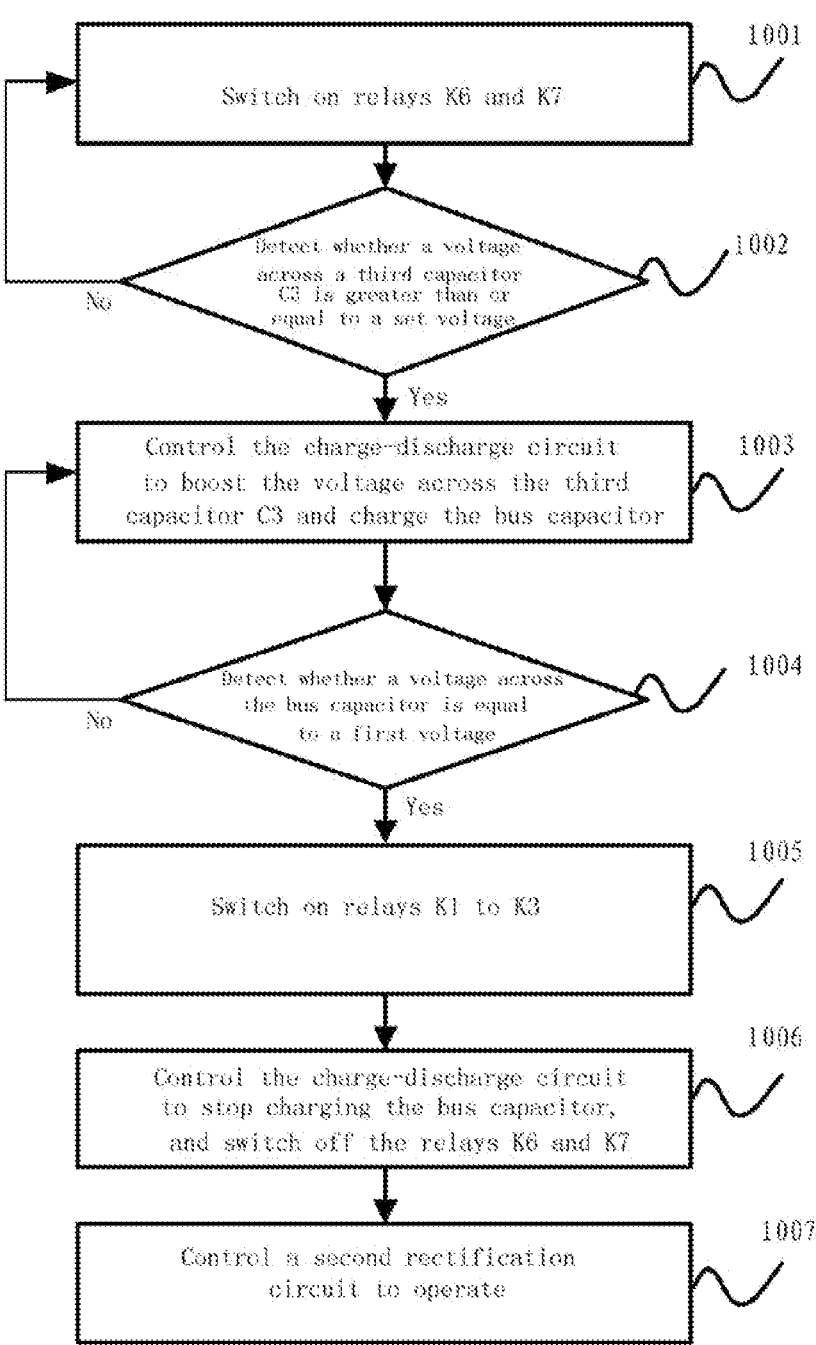

Switch on relays K6 and K7                                1001

Detect whether a voltage across a third capacitor C3 is greater than or equal to a set voltage     1002

No

Yes

Control the charge-discharge circuit to boost the voltage across the third capacitor C3 and charge the bus capacitor     1003

Detect whether a voltage across the bus capacitor is equal to a first voltage     1004

No

Yes

Switch on relays K1 to K3                                 1005

Control the charge-discharge circuit to stop charging the bus capacitor, and switch off the relays K6 and K7     1006

Control a second rectification circuit to operate     1007

FIG. 10

UNINTERRUPTIBLE POWER SUPPLY, CONTROL METHOD AND POWER SUPPLY SYSTEM

The present application claims priority to Chinese Patent Application No. 202310644269.2, titled "INVERTER CONTROL METHOD, APPARATUS AND DEVICE", filed on Jun. 1, 2023 with the China National Intellectual Property Administration, which is incorporated herein by reference in its entirety.

FIELD

The present application relates to the field of electric power, and in particular to an uninterruptible power supply, a control method and a power supply system.

BACKGROUND

An uninterruptible power supply (UPS) is a device that replaces a grid to supply power to a load without interruption when the grid malfunctions, so as to maintain the normal operation of the load. Specifically, the uninterruptible power supply is connected to the grid and the load, and monitors an operation status of the grid. When the grid operates normally, the uninterruptible power supply supplies electric energy provided by the grid to the load. When the grid fails, the uninterruptible power supply controls its internal battery pack to discharge, and supplies electric energy outputted by the battery pack to the load.

The uninterruptible power supply is equipped with a bus capacitor. When the uninterruptible power supply is connected to the grid for the first time or when the uninterruptible power supply is reconnected to the grid after a fault of the grid is removed, a voltage across the bus capacitor is approximately equal to zero, and a difference between the voltage across the bus capacitor and the grid voltage is too large.

In order to improve safety of power supply, before the uninterruptible power supply supplies power to the load, a rectification circuit in the uninterruptible power supply or a special rectification circuit generally pre-charges the bus capacitor so as to start the uninterruptible power supply. In practice, the electric energy transmitted on the grid is generally converted into DC electric energy through an uncontrollable switch device to charge the bus capacitor. Therefore, the pre-charge voltage of the bus capacitor is limited by an amplitude of the grid voltage. When the grid is connected to the uninterruptible power supply after charging, the difference between the voltage across the bus capacitor and the grid voltage may be too large due to fluctuation of the output voltage of the grid and the power supply of the load inside the uninterruptible power supply, resulting in failure of start of the uninterruptible power supply. In severe cases, contacts of switch devices between the uninterruptible power supply and the grid are conglutinated, thus failing to disconnect the uninterruptible power supply from the grid, and resulting in damage to the uninterruptible power supply.

SUMMARY

An uninterruptible power supply, a control method and a power supply system are provided according to the present application, to normally start the uninterruptible power supply and secure a switch device.

The specific technical solutions according to the embodiments of the present application are as follows.

In a first aspect, an uninterruptible power supply is provided according to the present application. The uninterruptible power supply includes at least a first rectification circuit, a bus capacitor, a second rectification circuit, a first switch circuit, a charge-discharge circuit. The first rectification circuit is connected to the charge-discharge circuit, for connecting to an alternating current power supply. The charge-discharge circuit is connected to the bus capacitor. The first switch circuit is connected to the second rectification circuit, for connecting to the alternating current power supply In practice, the uninterruptible power supply is generally equipped with a battery pack or connected to a battery pack. The charge-discharge circuit is connected between the battery pack and the bus capacitor, and is configured to charge or discharge the battery pack, so as to continue to supply power to the load after the alternating current power supply fails, thereby realizing the continuous power supply of the uninterruptible power supply. The charge-discharge circuit can regulate the voltage. When the alternating current power supply is connected, in order to reduce the voltage difference between the bus capacitor and the alternating current power supply and start the uninterruptible power supply safely, the charge-discharge circuit performs voltage regulation and the first rectification circuit performs rectification, rectifying and regulating the electric energy outputted by the alternating current power supply. Finally, the bus capacitor is charged until the voltage across the bus capacitor reaches the first voltage. Since boosted by the charge-discharge circuit, the charging voltage of the bus capacitor is not limited by the voltage amplitude of the alternating current power supply, and compensates for the voltage drop caused by the internal load operation of the uninterruptible power supply and the voltage fluctuation of the alternating current power supply. In this case, the first switch circuit is controlled to be on, the second rectification circuit is controlled to operate, the uninterruptible power supply is started normally and supplies power to the load connected to the bus capacitor, and the first switch circuit is protected.

In a possible design, a battery pack is arranged inside the uninterruptible power supply. The battery pack is connected to the charge-discharge circuit, and is configured to output the stored voltage to the charge-discharge circuit. The charge-discharge circuit is further configured to: charge the bus capacitor after boosting the voltage outputted by the battery pack until the voltage across the bus capacitor reaches the first voltage.

With the uninterruptible power supply, when the battery pack stores electric energy, the charge-discharge circuit pre-charges the bus capacitor after boosting the electric energy stored in the battery pack, thereby pre-charging the bus capacitor flexibly.

In a possible implementation, the uninterruptible power supply also includes a second switch circuit connected between the battery pack and the charge-discharge circuit, and a third switch circuit connected between the first rectification circuit and the charge-discharge circuit. The second switch circuit is configured to control a connection between the battery pack and the charge-discharge circuit, and the third switch circuit is configured to control a connection between the first rectification circuit and the charge-discharge circuit.

With the uninterruptible power supply, the second switch circuit is connected between the battery pack and the charge-discharge circuit, and when the second switch circuit is on, a charging circuit between the battery pack and the bus capacitor is formed. The third switch circuit is connected between the first rectification circuit and the charge-discharge circuit, and when the third switch circuit is on, a charging circuit between the first rectification circuit and the bus capacitor is formed. Therefore, by switching on the second switch circuit or the third switch circuit, the precharging path of the bus capacitor is selected.

In a possible implementation, the uninterruptible power supply also includes a first controller. The first controller is connected to the charge-discharge circuit and is configured to control the charge-discharge circuit to charge the bus capacitor after boosting the stored voltage outputted by the battery pack or the voltage ouputted by the first rectification circuit.

In a possible implementation, the first controller is connected to the first switch circuit, the second switch circuit and the third switch circuit, and is configured to switch on the first switch circuit, the second switch circuit and the third switch circuit.

In a possible implementation, the uninterruptible power supply also includes a second controller. The second controller connected to the first switch circuit, the second switch circuit and the third switch circuit, and configured to switch on the first switch circuit, the second switch circuit and the third switch circuit.

In a possible implementation, the uninterruptible power supply also includes a voltage sensor connected to the bus capacitor and configured to measure the voltage across the bus capacitor.

In a possible implementation, in case that the uninterruptible power supply is connected to an alternating current load, in order to supply power to the alternating current load, the uninterruptible power supply also includes an inverter circuit connected to the bus capacitor and configured to convert the voltage across the bus capacitor into a power supply voltage for a downstream load, and supply power to the load.

In a second aspect, a power supply system is provided according to an embodiment of the present application. The power supply system includes a power supply, an alternating current power supply, and the uninterruptible power supply in the first aspect of embodiments of the present application.

The uninterruptible power supply is connected to the load and the alternating current power supply, and is configured to: convert a voltage outputted by the alternating current power supply into a power supply voltage of the load and supply power to the load; and convert electric energy stored in a battery pack into the power supply voltage of the load and supply power to the load when the power supply malfunctions.

In a third aspect, a method for controlling the uninterruptible power supply is provided according to an embodiment of the present application. The method is applied to the uninterruptible power supply according to the first aspect of the embodiment of the present application, and is performed by the control device in the uninterruptible power supply. The method includes: controlling the charge-discharge circuit to charge the bus capacitor; detecting the voltage across the bus capacitor; switching on the first switch circuit when it is determined that the voltage across the bus capacitor reaches the first voltage; and controlling the charge-discharge circuit to stop charging the bus capacitor, and controlling the second rectification circuit to operate.

In a possible implementation, the controlling the charge-discharge circuit to charge the bus capacitor includes: controlling the charge-discharge circuit to charge the bus capacitor after boosting a voltage stored in a battery pack; or controlling the charge-discharge circuit to charge the bus capacitor after boosting the voltage outputted by the first rectification circuit.

In a possible implementation, the method also includes: charging the input capacitor until the voltage across the input capacitor reaches a set voltage before the controlling the charge-discharge circuit to charge the bus capacitor, if an input capacitor is arranged in the charge-discharge circuit and a voltage across the input capacitor is zero.

With the method, if the input capacitor in the charge-discharge circuit is zero, the voltage across the input capacitor is first charged to the set voltage so that the charge-discharge circuit operates stably, and then the charge-discharge circuit is controlled to boost the voltage so that the charge-discharge circuit operates normally.

In a possible implementation, the method also includes: switching on a second switch circuit or a third switch circuit before the controlling the charge-discharge circuit to charge said bus capacitor; and switching off the second switch circuit or the third switch circuit after the controlling the charge-discharge circuit to stop charging the bus capacitor.

With the method, before the charge-discharge circuit charges the bus capacitor, the second switch circuit or the third switch circuit is controlled to be on, so as to connect the charge-discharge circuit to the charging power supply. Once the charge-discharge circuit stops charging the bus capacitor, the charge-discharge circuit is disconnected from the charging power supply by switching off the second switch circuit and the third switch circuit, in order to reduce circuit loss and component loss of the circuit.

In a fourth aspect, a computer storage medium is provided according to an embodiment of the present application. A computer program is stored in the computer storage medium. When the computer program in the computer storage medium is executed by the control device in the uninterruptible power supply, the uninterruptible power supply performs the method for controlling the uninterruptible power supply in the third aspect of the embodiments of the present application.

In addition, the technical effects brought about by any one of the implementations from the second aspect to the fourth aspect can refer to the technical effects brought about by the implementations in the first aspect of the embodiments of the present application, and thus are not repeated here.

BRIEF DESCRIPTION OF THE DRAWINGS

In order to more clearly illustrate the technical solutions in the embodiments of the present application, the drawings to be used in the description of the embodiments are described briefly below. Apparently, the drawings in the following description show only some embodiments of the present application, and those skilled in the art may obtain other drawings based on these drawings without any creative effort.

FIG. 10 is a schematic flowchart of a method for controlling an uninterruptible power supply according to a second embodiment of the present application.

DETAILED DESCRIPTION

Figure 1:
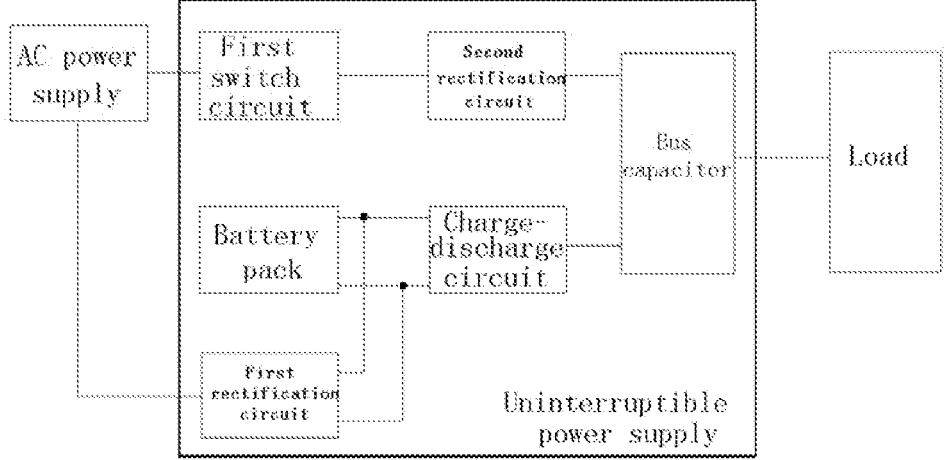
FIG. 1 is a schematic structural diagram of an uninterruptible power supply according to an embodiment of the present application.

Embodiments of the present application are described in detail below with reference to the drawings.

The terms in the embodiments of the present application are only for the purpose of explaining specific embodiments of the present application, rather than limiting the present application. Apparently, the described embodiments are only some rather than all of the embodiments of the present application. Based on the embodiments in the present application, all other embodiments obtained by those skilled in the art without creative efforts belong to the scope of protection of the present application.

It should be noted that the terms "first" and "second" in the description and claims of the present application and the above drawings are for the purpose of distinguishing similar objects, rather than describing a specific sequence or order. It should be understood that the terms so used are interchangeable under appropriate circumstances such that the embodiments of the present application described herein can be practiced in sequences different from those illustrated or described herein. The implementations described in the following exemplary embodiments do not represent all implementations consistent with the present application. Instead, the described implementations are merely examples of devices and methods consistent with aspects of the present application as recited in the appended claims.

In the following, some terms used in the embodiments of the present application are explained, so as to facilitate the understanding by those skilled in the art.

(1) The term "multiple" in the embodiments of the present application refers to two or more, and other quantifiers are similar.

(2) The controllable switch device in the embodiments of the present application refers to a device that is switched on or off based on an electrical signal. For example, the controllable switch device includes one or more of a relay, a metal oxide semiconductor field effect transistor (MOS-FET), a bipolar junction transistor (BJT), an insulated gate bipolar transistor (IGBT), a silicon carbide (SiC) transistor, a silicon-controlled rectifier (SCR) and other types of switch transistors, which are not listed in the embodiments of the present application. The switch transistors may be packaged separately or together, which is not limited in the embodiments of the present application. Each switch transistor may include a first terminal, a second terminal and a control terminal. The control terminal is configured to switch on or off the switch transistors. When the switch transistor is on, a current is transmitted between the first terminal and the second terminal of the switch transistor. When the switch transistor is off, no current is transmitted between the first terminal and the second terminal of the switch transistor. For example, the control terminal of a MOSFET is the gate, the first terminal is the source, and the second terminal is the drain. Alternatively, the first terminal of the MOSFET is the drain, and the second terminal is the source.

It should be noted that the SCR is a unidirectional silicon-controlled rectifier that transmits the current in one direction only, and the MOSFET without equipped with diodes at both ends transmits the current in one direction only. Therefore, in order to transmit the current bidirectionally, generally two SCRs or two MOSFETs cooperate.

(3) The uncontrollable switch device in the embodiments of the present application refers to a device that fails to be switched on or off based on an electrical signal, for example, one or more of various types of switch transistors such as a voltage regulator transistor and a rectifier diode.

(4) "Connection" in the embodiments of the application may be understood as electrical connection or communication connection. The electrical connection of two electrical components may be a direct or indirect connection between the two electrical components. For example, the connection between A and B may be a direct connection between A and B, or an indirect connection between A and B via one or more other electrical components. For example, A and B are connected may be that A and C are directly connected, C and B are directly connected, and thus A and B are connected via C. The communication connection between two electrical components is a wireless connection between the two electrical components, that is, the two electrical components are electromagnetically connected.

(5) DC and alternating current. The DC in the embodiments of the present application refers to an electrical form in which electric energy flows along a constant direction in a circuit. The direction of conduction of electric energy is also called phase, and the phase of the DC may be positive or negative. The power intensity of most DC is fixed, the power intensity of some special DC (such as pulsed DC) may change with time. The power intensity is also called current amplitude. Common DC power supplies include dry batteries, storage batteries, or DC generators. The alternating current in the embodiments of the present application refers to an electrical form in which electric energy flows along a periodically changing direction in a circuit. The power strength of most alternating currents also varies periodically over time. The periodic variation of the alternating current in the direction of conduction is defined by the frequency of the alternating current. When the frequency of the alternating current is higher, the alternating current may change the direction of conduction faster, and when the frequency of the alternating current is lower, the alternating current may change the direction of conduction slowly. Common alternating current power supplies include utility power, industrial and agricultural power, and residential power.

(6) Transformation ratio. The "transformation ratio" of the circuit in the embodiments of the present application refers to the ratio between the input voltage and the output voltage of the circuit. If the circuit performs boost processing, the voltage amplitude of the input voltage is smaller than the voltage amplitude of the output voltage. If the circuit performs step-down processing, the voltage amplitude of the input voltage is greater than the voltage amplitude of the output voltage.

The technical solutions in the embodiments of the present application will be clearly and completely described below in conjunction with the drawings in the embodiments of the present application. The technical solutions according to the embodiments of the present application are applied to devices to be supplied with power for a period of time when the power supply is disconnected. For example, an uninterruptible power supply is generally configured in a data center in order to prevent the loss of important data when the data center suddenly loses power. The uninterruptible power supply supplies power when the power grid or other power supply malfunctions, and the data center can store important data during this period of time.

The above devices include but are not limited to: vehicles, robots, lighting equipment, industrial equipment, smart factory equipment, etc. Vehicles according to embodiments of the present application may include one or more different types of transports or movable objects that operate or move on land (e.g., roads, streets, railways, etc.), water (e.g., waterways, rivers, oceans, etc.) or space. For example, the transport may include trains, subways, airplanes, boats, aircraft, or other types of means of transportation or movable objects.

An uninterruptible power supply, a control method and a power supply system are provided according to embodiments of the present application, to normally start the uninterruptible power supply and secure the uninterruptible power supply.

The inventive concept of the present application is summarized as follows. The charge-discharge circuit performs boost processing to pre-charge the bus capacitor, thereby increasing the pre-charge voltage of the bus capacitor to compensate for the voltage drop of the bus capacitor caused by the fluctuation in the AC power supply voltage and the power supply to an internal load. Therefore, the voltage drop between the AC power supply and the bus capacitor is reduced, thus ensuring the uninterruptible power supply to be started successfully, and securing the components of the first switch circuit.

FIG. 1 is a schematic structural diagram of the uninterruptible power supply according to an embodiment of the present application. Referring to FIG. 1, the uninterruptible power supply includes at least a first rectification circuit, a charge-discharge circuit, a bus capacitor, a first switch circuit and a second rectification circuit.

It should be understood that the uninterruptible power supply shown in FIG. 1 is merely an example. The uninterruptible power supply may have more or fewer components than shown in FIG. 1, may combine two or more components, or may have a different configuration of components. The various components shown in FIG. 1 may be implemented in hardware, software, or a combination of hardware and software including one or more signal processing and/or application specific integrated circuits.

The input terminal of the second rectification circuit is configured to be connected to the AC power supply via the first switch circuit. The output terminal of the second rectification circuit is connected to the bus capacitor. The second rectification circuit converts the AC outputted by the AC power supply into DC, and stabilizes the DC via the bus capacitor to supply power to a downstream load. The uninterruptible power supply is generally configured with or connected to a battery pack, and the battery pack is connected to the bus capacitor via the charge-discharge circuit. The charge-discharge circuit may have a charging function and a discharging function. When the AC power supply normally outputs electric energy, a terminal of the charge-discharge circuit connected to the bus capacitor functions as the input terminal, and a terminal of the charge-discharge circuit connected to the battery pack functions as the output terminal. The charge-discharge circuit performs charging, i.e., converts the voltage of the bus capacitor into the charging voltage of the battery pack, and charges the battery pack. When the AC power fails to supply power, a terminal of the charge-discharge circuit connected to the battery pack functions as the input terminal, and a terminal of the charge-discharge circuit connected to the bus capacitor functions as the output terminal. The charge-discharge circuit performs discharging, i.e., converts the electric energy stored in the battery pack and outputs the converted electric energy to the bus capacitor, and supplies power to the load after the voltage is stabilized by the bus capacitor, so as to meet the power supply demand of the load connected to the uninterruptible power supply.

The AC power supply may be a grid or other power supply. The grid may be, but is not limited to: a utility grid, a micro grid, a household grid, an industrial grid, and the like. Other power supply may be, but is not limited to: renewable energy power generation systems, diesel generators, etc.

In practice, the second rectification circuit includes multiple switch devices. The switch device may be a controllable switch device or an uncontrollable switch device. Before the second rectification circuit operates, the bus capacitor inside the uninterruptible power supply has already stored electric energy, and this electric energy can be supplied to the control device of the controllable switch device. Therefore, the present application preferably adopts the controllable switch device in order to improve the rectification efficiency and power factor of the second rectification circuit.

Referring to FIG. 1, the second rectification circuit is connected to the AC power supply via the first switch circuit. The first switch circuit controls the connection between the uninterruptible power supply and the external AC power supply. When the AC power supply fails, the first switch circuit disconnects the uninterruptible power supply from the AC power supply to prevent the failure of the AC power supply from affecting the normal operation of the uninterruptible power supply. When the failure of the AC power supply is eliminated, the first switch circuit reconnects the uninterruptible power supply to the AC power supply, so that the uninterruptible power supply can operate normally.

In practice, when the AC power supply resumes normal operation or when the uninterruptible power supply is firstly installed, the voltage across the bus capacitor is approximately equal to zero. If the first switch circuit is directly controlled to be switched on, a contact of the switch device inside the first switch circuit may be conglutinated due to the excessive voltage difference between the alternating current power supply and the bus capacitor, and the uninterruptible power supply may fail to start. In order to reduce the voltage difference between the alternating current power supply and the bus capacitor, the uninterruptible power supply according to the embodiment of the present application pre-charges the bus capacitor via the first rectification circuit and the charge-discharge circuit.

Specifically, the input terminal of the first rectification circuit is configured to be connected to the AC power supply. The output terminal of the first rectification circuit is connected to the bus capacitor via the charge-discharge circuit. When the fault of the AC power supply is removed or the uninterruptible power supply is installed for the first time, the first rectification circuit acquires power from the AC power supply, rectifies the output voltage of the AC power supply, and then outputs the rectified voltage to the charge-discharge circuit. The charge-discharge circuit pre-charges the bus capacitor after boosting the voltage outputted by the first rectification circuit. When the voltage across the bus capacitor reaches the first voltage, the charge-discharge circuit stops charging the bus capacitor. The first voltage may be greater than or equal to a peak voltage of the AC power supply, thereby compensating the voltage drop caused by the voltage fluctuation of the AC power supply and internal devices, and reducing the voltage difference between the AC power supply and the bus capacitor. Then, the first switch circuit is controlled to be switched on, and the second rectification circuit is controlled to operate, and therefore the uninterruptible power supply can operate normally.

In practice, multiple switch devices are arranged in the charge-discharge circuit. In order to boost the electric energy outputted by the first rectification circuit, the multiple switch devices are switched on or off to modify the transformation ratio of the charge-discharge circuit, thereby regulating the charging voltage of the bus capacitor. Through the above pre-charging of the bus capacitor, the charging voltage of the bus capacitor is not limited by the amplitude of the AC power supply. Therefore, the voltage difference between the bus capacitor and the AC power supply can be reduced after the pre-charging, and the uninterruptible power supply can be successfully started.

In an example, the voltage drop generated by the internal load supplied by the uninterruptible power supply is determined based on the parameters of the internal load of the uninterruptible power supply, and the voltage amplitude of the first voltage is determined based on the voltage drop. The internal load may be a load that is to be powered during the startup process of the uninterruptible power supply, for example, the auxiliary source and the controller of the charge-discharge circuit. The above parameters include but not limited to the rated power of the load and the voltage drop generated on the internal line.

In an example, the uninterruptible power supply may be provided with a sensor or connected to an external sensor. The sensor is connected to the AC power supply, and monitors the change in the voltage amplitude of the AC power supply. Therefore, the voltage amplitude of the first voltage may be determined based on the change in the voltage amplitude of the AC power supply and the parameters of the internal load of the uninterruptible power supply.

In practice, the uninterruptible power supply according to the embodiment of the present application pre-charges the bus capacitor via boost processing by the charge-discharge circuit. The charge-discharge circuit is also connected to the battery pack which can store electrical energy. Therefore, in the embodiment of the present application, the electric energy stored in the battery pack may also be used to pre-charge the bus capacitor. Details about the pre-charging of the bus capacitor are described below in conjunction with the embodiments.

In a first embodiment, the battery pack pre-charges the bus capacitor via the charge-discharge circuit.

The battery pack is connected to the bus capacitor via the charge-discharge circuit, and acquires electric energy for pre-charging the bus capacitor from an external power supply.

In an example, multiple devices in the uninterruptible power supply are connected through power lines and ports. Therefore, the pre-charged battery pack is connected to the charge-discharge circuit through corresponding ports so as to provide charging power to the bus capacitor.

In another example, the battery pack in the uninterruptible power supply is also connected to other external power supplies, and the other external power supplies charges the battery pack, so that the charged battery pack can meet the pre-charging requirements of the bus capacitor.

In the second embodiment, the AC power supply pre-charges the bus capacitor.

If the electrical energy stored in the battery pack in the uninterruptible power supply is insufficient or the battery pack fails to be pre-charged, the AC power supply charges the bus capacitor. The first rectification circuit is connected to an external AC power supply through a power line and a port, and acquires power from the AC power supply. The acquired electric energy is rectified by the first rectification circuit and boosted by the charge-discharge circuit sequentially, and is outputted to the bus capacitor for pre-charging the bus capacitor.

In an example, multiple switch devices are arranged in the first rectification circuit. If neither the bus capacitor nor the battery pack stores electric energy, the switch devices in the first rectification circuit are uncontrollable switch devices in order to prevent the controllable switch device from malfunction due to power failure of the control device.

In another example, multiple switch devices are arranged in the first rectification circuit. The switch devices in the first rectification circuit may be controllable or uncontrollable, if the battery pack or bus capacitor in the uninterruptible power supply already stores electric energy.

In practice, the first rectification circuit acquires electric energy from an AC power supply and pre-charges the bus capacitor. In order to prevent a large inrush current in the circuit, a current limiting resistor is arranged in the first rectification circuit to reduce the amplitude of the current outputted by the first rectification circuit.

Figure 2:
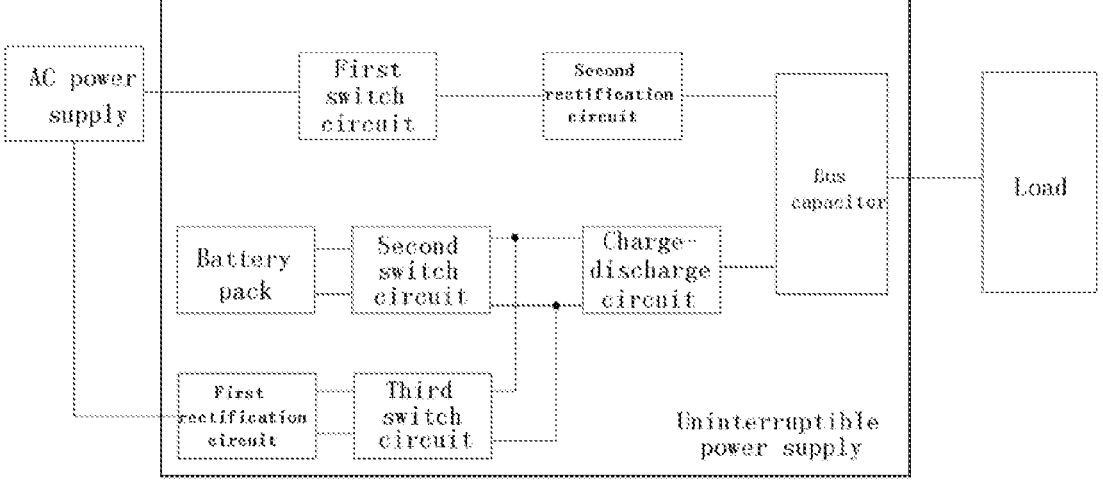
FIG. 2 is a structural schematic diagram of an uninterruptible power supply according to another embodiment of the present application.

Based on the foregoing description, it can be seen that there are two ways to pre-charge the bus capacitor, corresponding to two charging power supplies, namely, the battery pack and the AC power supply. In order to select a charging power supply for pre-charging the bus capacitor, the uninterruptible power supply according to the embodiment of the present application may further include a second switch circuit and a third switch circuit. Referring to FIG. 2, the second switch circuit is connected between the charge-discharge circuit and the battery pack, and the third switch circuit is connected between the first rectification circuit and the charge-discharge circuit. When the third switch circuit is turned on, the battery pack is connected to the bus capacitor via the charge-discharge circuit, and a pre-charging circuit of the bus capacitor is formed. When the third switch circuit is turned on, the first rectification circuit is connected to the bus capacitor via the charge-discharge circuit, and a pre-charging circuit of the bus capacitor is formed. Therefore, the pre-charging power supply is selected for the bus capacitor by turning on the second switch circuit and the third switch circuit.

In practice, in order to control the time at which the bus capacitor is pre-charged, the uninterruptible power supply is equipped with a sensor or connected to an external sensor. The sensor measures the voltage across the bus capacitor, and controls the charge-discharge circuit to end the pre-charging of the bus capacitor based on the voltage across the bus capacitor.

Details about the operation of the multiple devices in the uninterruptible power supply in the pre-charging the bus capacitor are described in detail separately below.

1. First Rectification Circuit

The first rectification circuit is provided with an AC terminal and a DC terminal. The AC terminal of the first rectification circuit single-phase or three-phase, and is for receiving single-phase AC power or three-phase AC power outputted by the AC power supply. The DC terminal of the first rectification circuit is connected to the third switch circuit for outputting the rectified DC power. The AC terminal of the first rectification circuit is provided with at least two ports, and the specific number of ports depends on the type of AC power transmitted by the AC power supply. For example, if the AC power supply transmit three-phase AC power in a three-phase four-wire mode, the AC terminal of the first rectification circuit is provided with four ports respectively connected to three phase wires and a neutral wire.

The first rectification circuit may include at least two bridge arms. Two switch devices are connected in series on each bridge arm. A middle node of each bridge arm is connected to a port at the AC end. The first terminal of each bridge arm is connected to the port receiving the high level at the first end of the third switch circuit. The second terminal of each bridge arm is connected to the port receiving the low level at the first end of the third switch circuit.

The number of bridge arms in the first rectification circuit depends on the type of AC transmitted by the AC power supply. The middle node of each bridge arm constitutes the AC end of the first rectification circuit. The first and second terminals of each bridge arm form the DC end of the first rectification circuit.

In practice, the two switch devices connected in series on each bridge arm may be controllable switch devices or uncontrollable switch devices. In order to prevent the control device of the controllable switch device from malfunctioning when there is no electric energy stored in the battery pack and the bus capacitor, the switch device in the first rectification circuit preferably adopts the uncontrollable switch device.

For ease of understanding, an example of the structure of the first rectification circuit is given below.

Figure 3:
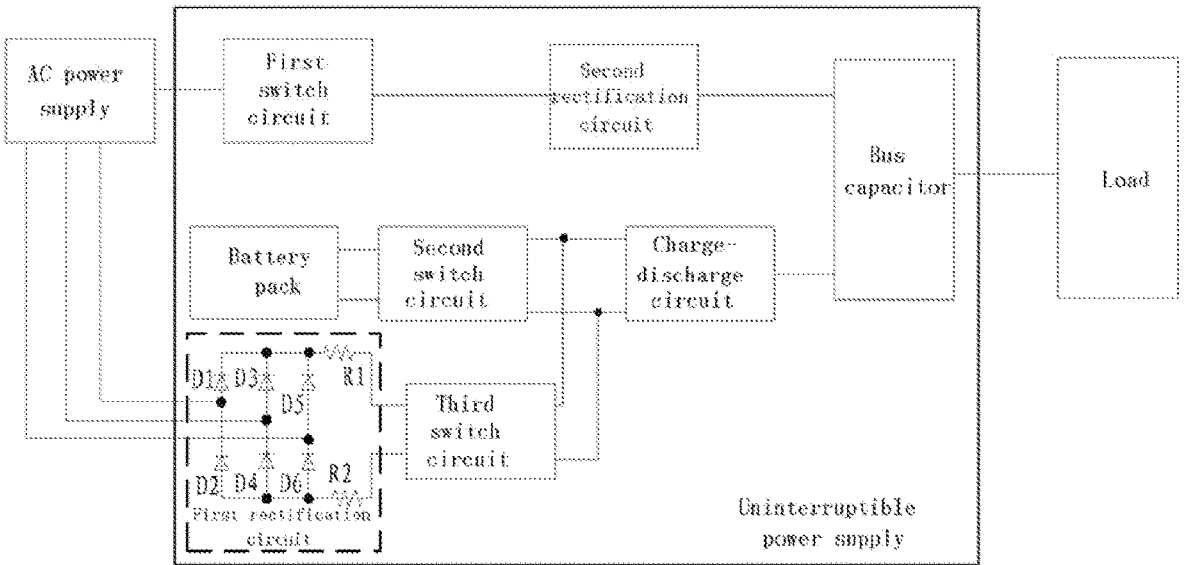
FIG. 3 is a schematic structural diagram of a first rectification circuit according to an embodiment of the present application.

Referring to FIG. 3, the AC power supply outputs three-phase AC power. The first rectification circuit includes three bridge arms. The first bridge arm includes diodes D1 and D2 connected in series. The second bridge arm includes diodes D3 and D4 connected in series. The third bridge arm includes diodes D5 and D6 connected in series. The middle node of the diodes D1 and D2 is connected to the port receiving the A-phase AC. The middle node of the diodes D3 and D4 is connected to the port for receiving the B-phase AC. The middle node of the diodes D5 and D6 is connected to the port receiving the C-phase AC. The first terminals of the diodes D1, D3 and D5 are connected to the port receiving the high level at the first end of the third switch circuit. The second terminals of the diodes D2, D4 and D6 are connected to the port receiving the low level at the first end of the third switch circuit. The A-phase AC, B-phase AC and C-phase AC are each single-phase AC and constitute the three-phase AC.

In practice, when the third switch circuit connected to the first rectification circuit is on, the first rectification circuit is connected to the charge-discharge circuit. The voltage amplitude across the input capacitor in the charge-discharge circuit may be low. If the first rectification circuit rectifies the electric energy outputted by the AC power supply and directly outputs the rectified electric energy to the charge-discharge circuit, an inrush current may be generated to damage multiple devices. Therefore, a current limiting resistor is also provided in the first rectification circuit. Referring to FIG. 3, resistors R1 and R2 are current limiting resistors. The current limiting resistor R1 is connected between the first terminals of the bridge arms and the third switch circuit. The current limiting resistor R2 is connected between the second terminals of the bridge arms and the third switch circuit. The resistance of current limiting resistors R1 and R2 depends on the current limit of the connected devices.

In an example, in order to reduce the cost or the size of the uninterruptible power supply, only one current limiting resistor is provided in the first rectification circuit. The current limiting resistor is connected between the switch device of the first rectification circuit and the first capacitor C1.

The above introduction to the structure of the first rectification circuit is only an example. In practice, the first rectification circuit may also adopt other structures. For example, the first rectification circuit may be a single-phase uncontrollable bridge circuit for single-phase rectification.

2. Second Rectification Circuit

The second rectification circuit may have an input terminal and an output terminal. The AC end of the second rectification circuit is connected to an external AC power supply through the first switch circuit. The DC end of the second rectification circuit is connected to the bus capacitor.

The AC end of the second rectification circuit is a single-phase AC end or a three-phase AC end, and is for receiving single-phase AC power or three-phase AC power outputted by the AC power supply. The AC end of the second rectification circuit includes at least two ports, and the specific number of ports depends on the type of AC power transmitted by the AC power supply.

In practice, the second rectification circuit may be, but not limited to, a fully-controlled rectification circuit, a half-control rectification circuit and an uncontrollable rectification circuit, each of which have one or more circuit topologies. The details of the circuit topologies can be referred to the existing circuit structure with rectification function.

For ease of understanding, a schematic structural diagram of the second rectification circuit is given below.

Figure 4:
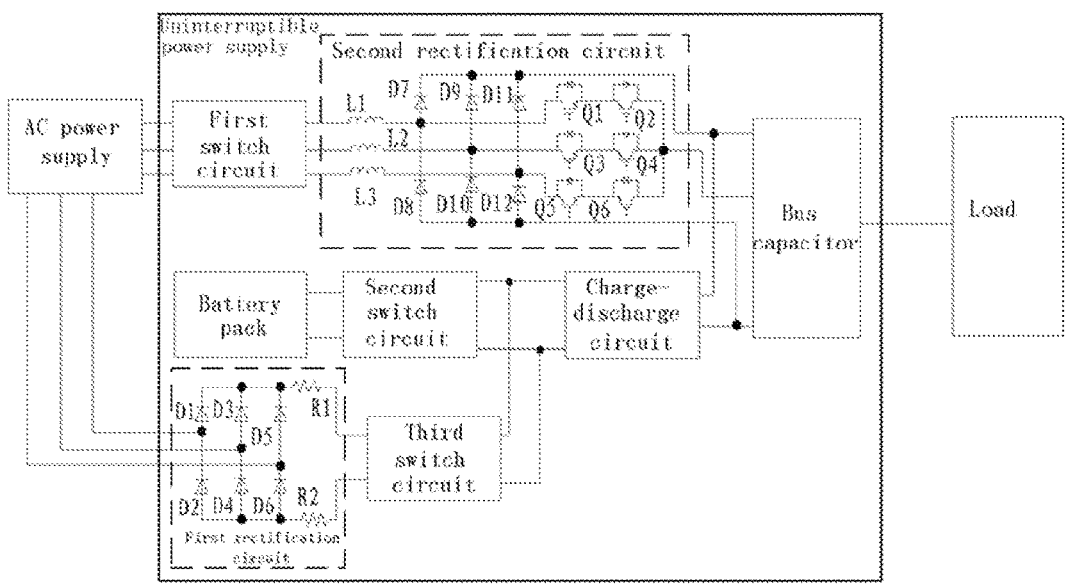
FIG. 4 is a schematic structural diagram of a second rectification circuit according to an embodiment of the present application.

For example, the AC power supply outputs three-phase AC power. The second rectification circuit adopts the existing Vienna circuit topology. Referring to FIG. 4, the first rectification circuit includes energy storage inductors L1 to L3, diodes D7 to D12, and controllable switches Q1 to Q6. The middle node of diodes D7 and D8 is connected to the energy storage inductor L1. The middle node of diodes D9 and D10 is connected to the energy storage inductor L2. The middle node of the diodes D11 and D12 is connected to the energy storage inductor L3. First terminals of the diodes D7, D9 and D11 are all connected to the first terminal of the bus capacitor. Second terminals of the diodes D8, D10 and D12 are all connected to the second terminal of the bus capacitor. One terminal of a branch formed by connecting the switch transistors Q1 and Q2 in series is connected to the middle node of the diodes D7 and D8, and the other terminal of the branch is connected to the middle node of the bus capacitor. One terminal of a branch formed by connecting the switch transistors Q3 and Q4 in series is connected to the middle node of the diodes D9 and D10, and the other terminal of the branch is connected to the middle node of the bus capacitor. One terminal of a branch formed by connecting the switch transistors Q5 and Q6 in series is connected to the middle node of the diodes D11 and D12, and the other terminal of the branch is connected to the middle node of the bus capacitor. The energy storage inductor L1 is connected to the port of the AC power supply outputting the A-phase AC power through the first switch circuit. The energy storage inductor L2 is connected to the port of the AC power supply outputting the B-phase AC power through the first switch circuit. The energy storage inductor L3 is connected to the port of the AC power supply outputting the C-phase AC power through the first switch circuit.

In an example, a parasitic diode is provided to the switch device in the second rectification circuit or a diode is connected in parallel with the switch device.

In an example, the switch device in the second rectification circuit may be an uncontrollable switch device.

The above introduction to the structure of the second rectification circuit is only an example. In practice, the first rectification circuit may also adopt other structures, which are not limited herein.

3. Bus Capacitor

The bus capacitor has a first terminal and a second terminal. The first terminal may be a terminal where the bus capacitor receives a high level. The second terminal may be a terminal where the bus capacitor receives a low level.

In practice, at least one capacitor may be included in the bus capacitor. When only one capacitor is included in the bus capacitor, the first terminal of the capacitor is the first terminal of the bus capacitor, and the second terminal of the capacitor is the second terminal of the bus capacitor. When the bus capacitor includes multiple capacitors, the multiple capacitors may be connected in series or in parallel.

In an example, multiple capacitors in the bus capacitor are connected in parallel, first terminals of the multiple capacitors are connected to form the first terminal of the bus capacitor, and second terminals of the multiple capacitors are connected to form the second terminal of the bus capacitor.

Figure 5:
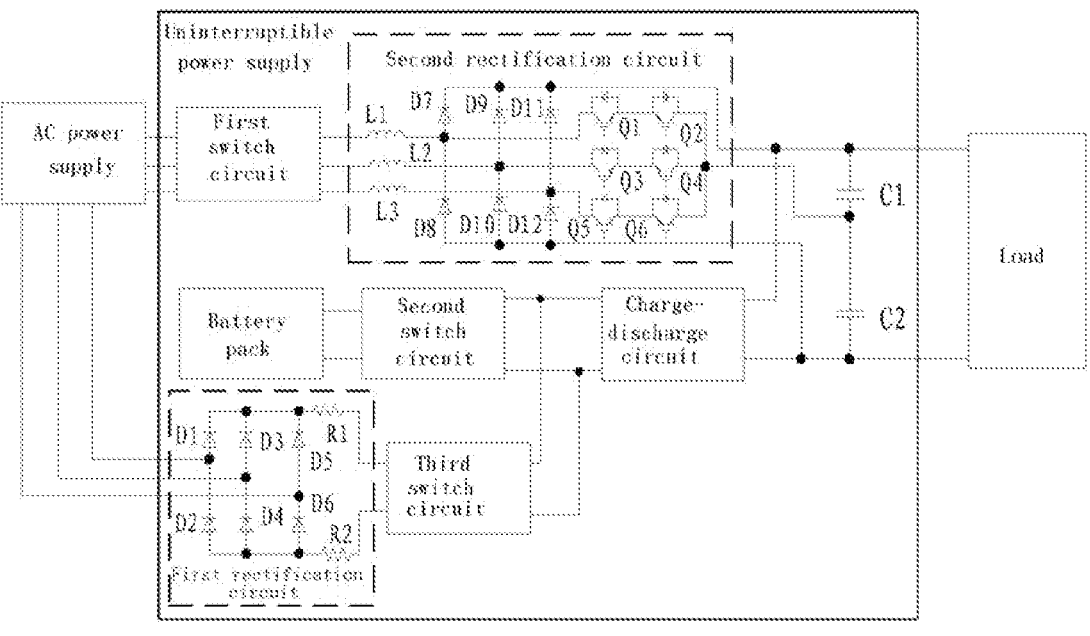
FIG. 5 is a schematic structural diagram of a bus capacitor according to an embodiment of the present application.

In an example, multiple capacitors in the bus capacitor are connected in series. The first terminal of a first capacitor in the multiple capacitors in series is the first terminal of the bus capacitor, and the second terminal of a last capacitor in the multiple capacitors in series is the second terminal of the bus capacitor. For example, as shown in FIG. 5, the bus capacitor includes a first capacitor C1 and a second capacitor C2 connected in series. The first terminal of the first capacitor C1 is the first terminal of the bus capacitor. The second terminal of the second capacitor C2 is the second terminal of the bus capacitor.

The above introduction to the bus capacitor structure is merely an example. In practice, the bus capacitor may adopt other structures. For example, when the bus capacitor includes multiple capacitors, some capacitors may be connected in series and then connected in parallel, or some capacitors may be connected in parallel and then connected in series.

4. Charge-Discharge Circuit

The charge-discharge circuit has a first end and a second end. The first end of the charge-discharge circuit is connected to the battery pack through the second switch circuit, and is also connected to the first rectification circuit through the third switch circuit. The second end of the charge-discharge circuit is connected to the bus capacitor.

The charge-discharge circuit charges and discharges the battery pack. When the external AC power supply is connected to the uninterruptible power supply and supplies power to the uninterruptible power supply normally, the second end of the charge-discharge circuit serves as an input end, the first end of the charge-discharge circuit serves as an output terminal, and the charge-discharge circuit performs charging. The charge-discharge circuit converts the voltage across the bus capacitor into the charging voltage of the battery pack, and charges the battery pack. When the AC power supply fails, the first end of the charge-discharge circuit serves as the input end, the second end of the charge-discharge circuit serves as the output end, and the charge-discharge circuit performs discharging. The charge-discharge circuit converts the electric energy stored in the battery pack and outputs the converted electric energy to the bus capacitor. The electric energy, after stabilized by the bus capacitor, is supplied to the load connected downstream of the bus capacitor. The charge-discharge circuit also boosts the electric energy stored in the battery pack or the electric energy outputted by the first rectification circuit to pre-charge the bus capacitor when the uninterruptible power supply is installed for the first time or the AC power supply fails.

In practice, the charge-discharge circuit is but not limited to a boost circuit with a voltage boosting function or a Buck-Boost circuit with a voltage boosting function and a voltage reducing function.

For ease of understanding, an example of the charge-discharge circuit is given below.

Figure 6:
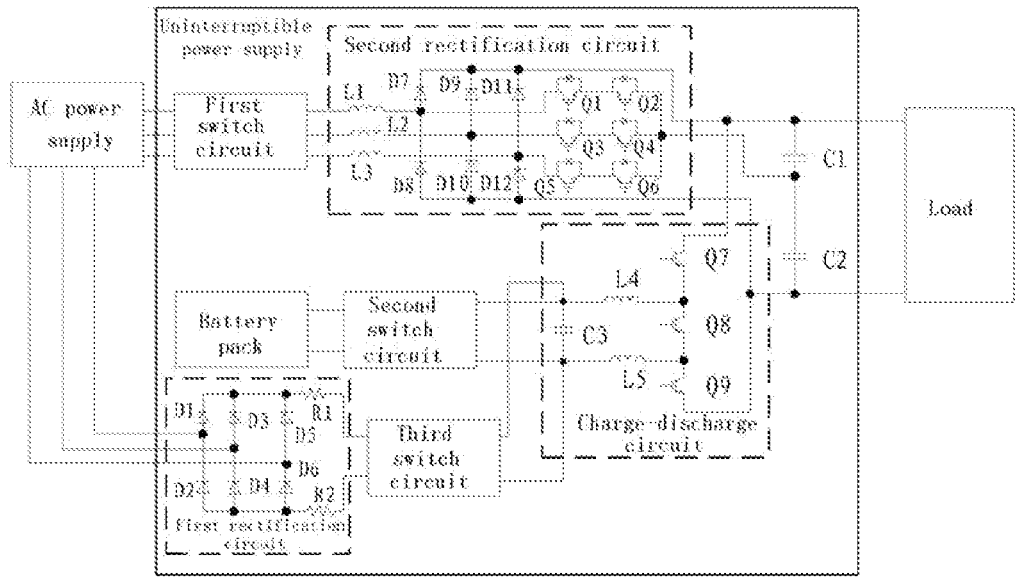
FIG. 6 is a schematic structural diagram of a charge-discharge circuit according to an embodiment of the present application.

FIG. 6 is a structural schematic diagram of the charge-discharge circuit. Referring to FIG. 6, the charge-discharge circuit includes a third capacitor C3, a switch transistor Q7, a switch transistor Q8 and a switch transistor Q9, and energy storage inductors L4 and L5. The third capacitor C3 serves as an input capacitor of the charge-discharge circuit. A first terminal of the switch transistor Q7 is connected to a first terminal of the bus capacitor. A second terminal of the switch transistor Q7 is connected to the first terminal of the switch transistor Q8. A second terminal of the switch transistor Q8 is connected to a first terminal of the switch transistor Q9. A second terminal of the switch transistor Q9 is connected to a second terminal of the bus capacitor. A first terminal of the energy storage inductor L4 is connected to the first terminal of the third capacitor C3. A second terminal of the energy storage inductor L4 is connected to the second terminal of the switch transistor Q7. A first terminal of the energy storage inductor L5 is connected to the second terminal of the third capacitor C3. A second terminal of the energy storage inductor L5 is connected to the second terminal of the switch transistor Q8. The first terminal of the third capacitor C3 is connected to terminals of the second switch transistor circuit and the third switch transistor circuit, where the terminals each output a high level. The second terminal of the third capacitor C3 is connected to terminals of the second switch transistor circuit and the third switch transistor circuit, where the terminals each output a low level.

In an example, the switch devices in the charge-discharge circuit are MOSFETs each equipped with a parasitic diode.

In another example, the switch devices in the charge-discharge circuit are BJTs and IGBTs each equipped with no parasitic diode.

Details about the pre-charging the bus capacitor by the charge-discharge circuit are described in detail below in conjunction with the structure of the charge-discharge circuit shown in FIG. 6.

Referring to FIG. 6, when the third switch circuit is on, the first rectification circuit rectifies the AC outputted by the AC power supply into DC. The DC is transmitted to the third capacitor C3 through the current limiting resistors R1 and R2. If the voltage across the third capacitor C3 is zero, the electric energy outputted by the second rectification circuit firstly charges the third capacitor C3, so that the charge-discharge circuit operates stably. When the voltage across the third capacitor C3 reaches a set voltage, the switch devices in the charge-discharge circuit are switched on, thereby boosting the voltage across the third capacitor C3. Similarly, when the second switch circuit is on, the charge-discharge circuit is switched on by switching on the switch transistor inside, and the electric energy stored in the battery pack is boosted to charge the bus capacitor.

When the voltage across the bus capacitor reaches the first voltage, it is determined that the charging of the bus capacitor ends. The switch transistors Q7 and Q9 are switched off. When there is no charging demand for the bus capacitor, the second switch circuit or the third switch circuit is cut off to avoid waste of electric energy. The set voltage depends on parameters such as the power supply demand of the load and the inductive reactance of the energy storage inductor.

The above introduction to the structure of the charge-discharge circuit is only an example. In practice, the charge-discharge circuit also adopts other structures, for example, the circuit or chip that performs the boost function, and the present application is not limited here.

5. First Switch Circuit

The first switch circuit has a first terminal and a second terminal. The first terminal of the first switch circuit is configured to be connected the external AC power supply. The second terminal of the first switch circuit is connected to the second rectification circuit. The first switch circuit controls the connection between the AC power supply and the second rectification circuit.

In practice, the first switch circuit includes at least one switches device, the number of switches device depends on the type of AC transmitted by the AC power supply.

Figure 7:
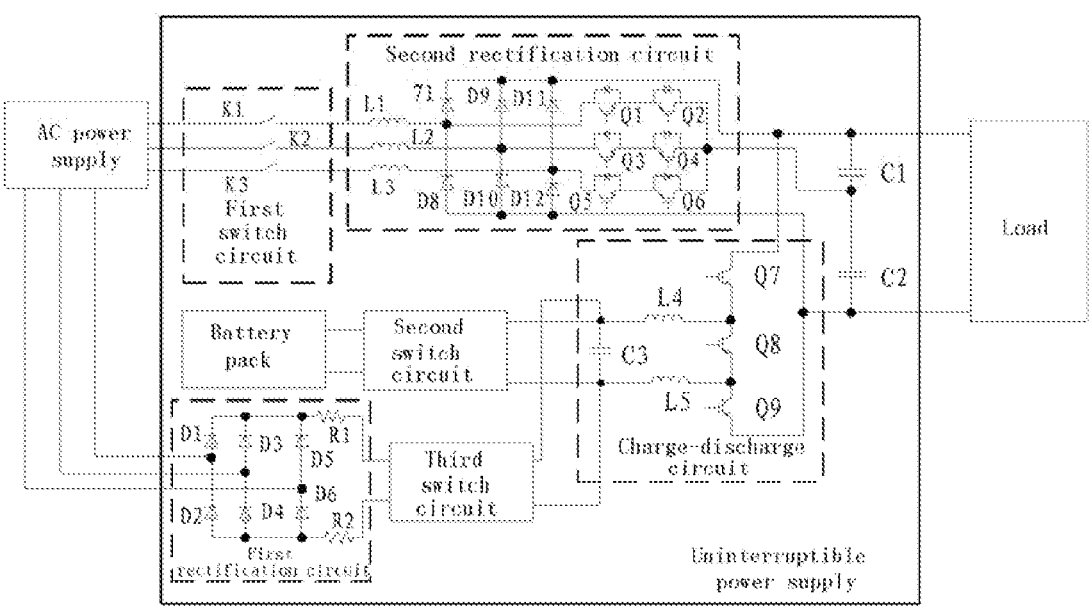
FIG. 7 is a schematic structural diagram of a first switch circuit according to an embodiment of the present application.

In an example, the switch device in the first switch circuit is a relay, in order to reduce the cost of the uninterruptible power supply. Referring to FIG. 7, the first switch circuit includes three relays K1 to K3. One terminal of the relay K1 is connected to the phase wire transmitting the A-phase AC power in the AC power supply. The other terminal of the relay K1 is connected to the energy storage inductor L1. One terminal of the relay K2 is connected to the phase wire transmitting the B-phase AC power in the AC power supply. The other terminal of the relay K2 is connected to the energy storage inductor L2. One terminal of the relay K3 is connected to the phase wire transmitting the C-phase AC power in the AC power supply. The other terminal of the relay K3 is connected to the energy storage inductor L3. When the relays K1 to K3 are on, the first switch circuit is on. When the relays K1 to K3 are off, the first switch circuit is off.

The above introduction to the structure of the first switch circuit is only an example. In practice, the switch device of the first switch circuit may be other switch devices besides the relay, which is not limited in the present application.

6. Second Switch Circuit and the Third Switch Circuit

The second switch circuit has a first end and a second end. The third switch circuit has a first end and a second end. The first end of the second switch circuit is connected with the battery pack. The second end of the first switch circuit is connected with the charge-discharge circuit. The first end of the third switch circuit is connected to the DC end of the first rectification circuit. The second end of the second switch circuit is connected to the charge-discharge circuit.

When the second switch circuit is on, the battery pack is connected to the charge-discharge circuit. When the second switch circuit is off, the battery pack is disconnected from the charge-discharge circuit. When the third switch circuit is on, the first rectification circuit is connected to the charge-discharge circuit. When the third switch circuit is off, the first rectification circuit is disconnected from the charge-discharge circuit.

In practice, the second switch circuit and the third switch circuit each include at least one switch device.

Figure 8:
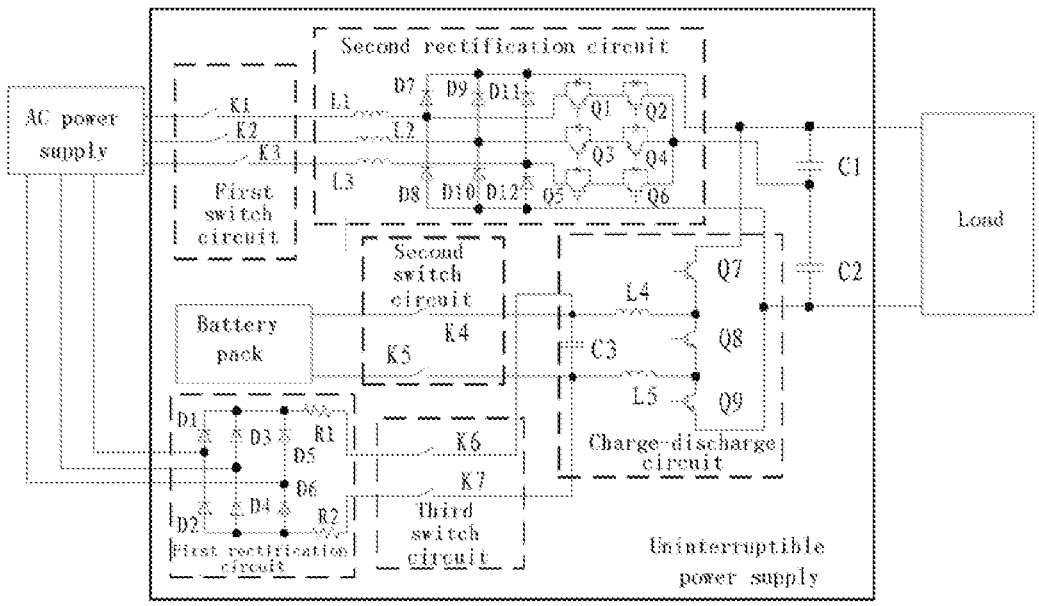
FIG. 8 is a schematic structural diagram of a second switch circuit and a third switch circuit according to an embodiment of the present application.

In an example, as shown in FIG. 8, the first switch circuit includes two relays K4 and K5, and the second switch circuit includes two relays K6 and K7. The relay K4 is connected between the positive pole of the battery pack and the first terminal of the third capacitor C3. The relay K5 is connected between the negative pole of the battery pack and the second terminal of the third capacitor C3. The relay K6 is connected between the current limiting resistor R1 and the first terminal of the third capacitor C3. The relay K7 is connected between the current limiting resistor R2 and the second terminal of the third capacitor C3.

Referring to FIG. 8, when the relays K4 and K5 are on, the battery pack is connected to the bus capacitor via the charge-discharge circuit, and the charging circuit between the battery pack and the bus capacitor is formed. When the relays K6 and K7 are on, the first rectification circuit is connected to the bus capacitor via the charge-discharge circuit, and the charging circuit between the first rectification circuit and the bus capacitor is formed. The second switch circuit is on when the relays K4 and K5 are on, and the second switch circuit is off when one or both of the relays K4 and K5 are off. Similarly, the third switch circuit is on when the relays K6 and K7 are on, and the third switch circuit is off when one or both of the relays K6 and K7 are off.

In another example, each of the second switch circuit and the third switch circuit includes only one relay, in order to reduce the cost of the uninterruptible power supply. The relay in the second switch circuit is connected between the positive pole of the battery pack and the first terminal of the third capacitor C3, or between the negative pole of the battery pack and the second terminal of the third capacitor C3. The relay in the third switch circuit is connected between the current limiting resistor R1 and the first terminal of the third capacitor C3, or between the current limiting resistor R2 and the second terminal of the third capacitor C3.

The above introduction to the structures of the second switch circuit and the third switch circuit are only examples. In practice, the switch devices in the second switch circuit and the third switch circuit may be other switch devices besides the relays, which is not limited in the present application.

The structures of the devices in the uninterruptible power supply and the pre-charging of the bus capacitor have been introduced above. The devices pre-charge the bus capacitor so as to compensate for the voltage drop caused by the voltage fluctuation of the AC power supply and the internal load power supply, thereby reducing the voltage difference between the bus capacitor and the AC power supply. In this way, the uninterruptible power supply can be started successfully and switch devices in the first switch circuit can be secured. In addition, since the voltage difference between the AC power supply and the bus capacitor is reduced due to the pre-charging of the bus capacitor, the second rectification circuit connected between the AC power supply and the bus capacitor adopts devices with smaller sizes and lower costs. Therefore, the cost of the uninterruptible power supply is further reduced.

As mentioned above, the second rectification circuit is controlled to operate to rectify the power outputted by the AC power supply and supply power to the load connected downstream of the bus capacitor, so that the uninterruptible power supply operates stably. In practice, since the DC power is transmitted on the bus capacitor, the bus capacitor directly supplies power to a DC load when the uninterruptible power supply is connected to the DC load. If the uninterruptible power supply is connected to an AC load, the uninterruptible power supply according to the embodiments of the present application further includes an inverter circuit. The inverter circuit is connected between the bus capacitor and the AC load, and converts the DC power on the bus capacitor into AC power to supply power to the AC load.

In practice, an existing discrete circuit or chip with an inverter function serves as the inverter circuit. For example, the inverter circuit includes multiple bridge arms. Two switch devices are connected in series on each bridge arm. The number of bridge arms in the inverter circuit depends on the power supply demand of the AC load. For example, if the AC load requires single-phase AC power, the inverter circuit is an H-bridge composed of two bridge arms.

Based on the above description, it can be seen that multiple circuits in the uninterruptible power supply are composed of switch devices, and they operate by switching on and off the switch devices. Therefore, the uninterruptible power supply according to the embodiments of the present application also includes a control device for switching on and off the switch device.

In an embodiment, the uninterruptible power supply further includes a first controller. The first controller is connected to the charge-discharge circuit, and is configured to control the charge-discharge circuit to boost the voltage outputted by the battery pack or the first rectification circuit to charge the bus capacitor.

Specifically, multiple switch devices are arranged in the charge-discharge circuit. The first controller is connected to control terminals of the switch devices in the above circuit, and sends corresponding driving signals to the control terminals of the switch devices, so as to control the charge-discharge circuit to boost the voltage outputted by the battery pack or the first rectification circuit to charge the bus capacitor.

In an example, the first controller is also connected to the first switch circuit, the second switch circuit and the third switch circuit. The first controller is also configured to switch on the first switch circuit, the second switch circuit and the third switch circuit, so as to select the way of pre-charging the bus capacitor, and control the connection between the uninterruptible power supply and the AC power supply.

In practice, for each of the first switch circuit, the second switch circuit, a switch is provided on a connecting line between the relay in the switch circuit and the power supply. The first controller is connected to the control terminal of the switch, and controls the connection of the relay to the power supply by controlling the state of the switch, thereby controlling the state of the relay.

In practice, the first controller is also connected to the second rectification circuit, and is configured to control the second rectification circuit to perform rectifying and supply power to the load when the first switch circuit is on.

In another example, the uninterruptible power supply further includes a second controller. The second controller is connected with the first switch circuit, the second switch circuit and the third switch circuit, and is configured to switch on the first switch circuit, the second switch circuit and the third switch circuit.

Based on the same inventive concept, a power supply system is also provided according to an embodiment of the present application. The power supply system includes a load, a power supply and the aforementioned uninterruptible power supply.

The uninterruptible power supply is connected to the load and the power supply, and is configured to convert the output voltage of the power supply into the supply voltage of the load and supply power to the load. The uninterruptible power supply is also configured to convert the electric energy stored in the battery pack into the supply voltage of the load and supply power to the load when the power supply fails.

Figure 9:
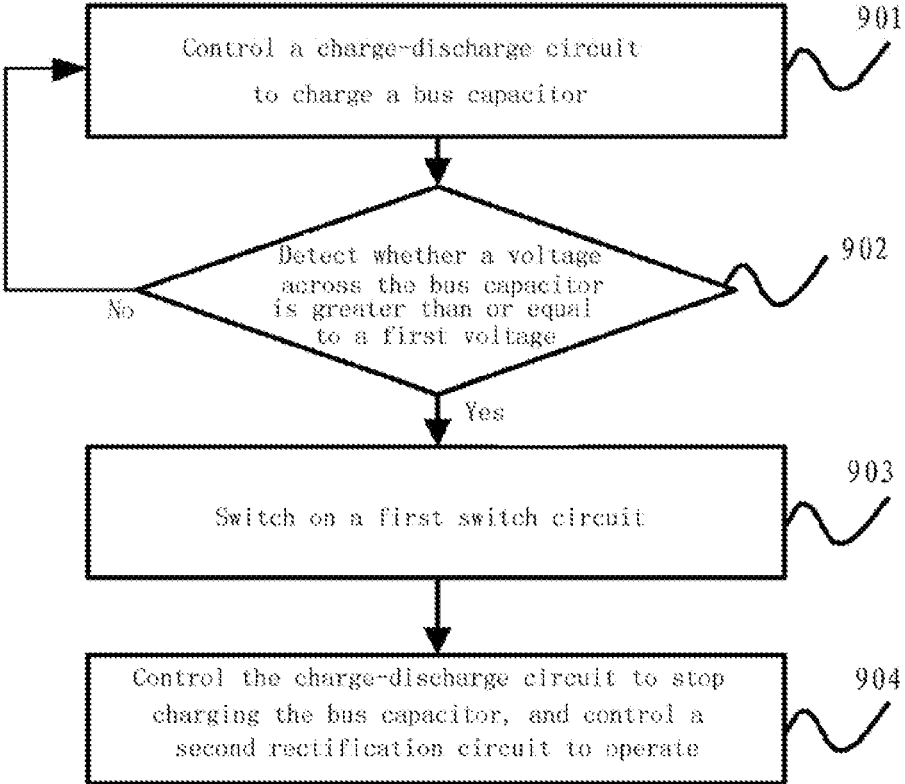
FIG. 9 is a schematic flowchart of a method for controlling an uninterruptible power supply according to a first embodiment of the present application.

Based on the same inventive concept, a method for controlling the uninterruptible power supply is also provided according to an embodiment of the present application. The method is applied to the uninterruptible power supply shown in FIG. 1 to FIG. 8, and is performed by the control device in the uninterruptible power supply. Referring to FIG. 9, the method for controlling the uninterruptible power supply includes the following steps 901 to 904.

In step 901, the charge-discharge circuit is controlled to charge the bus capacitor.

In step 902, it is determined whether the voltage across the bus capacitor is greater than or equal to the first voltage. If the voltage across the bus capacitor is greater than or equal to the first voltage, the method proceeds to step 903. Otherwise, the method returns to step 901.

In an example, a sensor is configured in the uninterruptible power supply or connected to an external sensor. This sensor is configured to monitor the voltage across the bus capacitor.

In practice, the sensor generally samples the voltage across the bus capacitor in a fixed cycle. In order to avoid the situation that the sensor fails to sample the voltage when the voltage across the bus capacitor already reaches the first voltage, the voltage across the bus capacitor being greater than or equal to the first voltage is determined as indicating the end of the charging of the bus capacitor.

In step 903, the first switch circuit is switched on.

In step 904, the charge-discharge circuit is controlled to stop charging the bus capacitor, and the second rectification circuit is controlled to operate.

In practice, as shown in FIG. 8, the charge-discharge circuit is connected to the battery pack via the second switch circuit, and connected to the first rectification circuit via the third switch circuit. Therefore, before the charge-discharge circuit charges the bus capacitor, the controller switches on the second switch circuit or the third switch circuit. When the second switch circuit is on, the charge-discharge circuit is connected to the battery pack, and boosts the voltage outputted by the battery pack to charge the bus capacitor. When the third switch circuit is on, the charge-discharge circuit is connected to the first rectification circuit, and boosts the voltage outputted by the first rectification circuit to charge the bus capacitor.

In an embodiment, the battery pack stores electrical energy and serves as a charging power supply for the bus capacitor. The second switch circuit is controlled to be on, and the battery pack is connected to the third capacitor.

Specifically, if the second switch circuit is on for a long time, the voltage across the third capacitor C3 is the voltage outputted by the battery pack. The charge-discharge circuit directly boosts the voltage across the third capacitor C3 to charge the bus capacitor. If the second switch circuit is off for a long time and when the second switch circuit is switched on, the battery pack first charges the third capacitor C3 before charging the bus capacitor. When the third capacitor C3 is charged to the set voltage value, and the charge-discharge circuit to boosts the voltage to charge the bus capacitor.

In another embodiment, the charging power supply for the bus capacitor is the first rectification circuit. Multiple relays in the third switch circuit are switched on, and the first rectification circuit is connected to the third capacitor C3. In order for the charge-discharge circuit to operate normally, before charging the bus capacitor, the first rectification circuit charges the third capacitor C3 until the voltage across the third capacitor C3 reaches a set voltage. After the charge-discharge circuit operates stably, the charge-discharge circuit is controlled to boost the voltage to charge the bus capacitor.

In practice, the bus capacitance is charged in the above two ways. When the charge-discharge circuit stops charging the bus capacitor, the second switch circuit or the third switch circuit is switched off in order to reduce the line loss and device loss between the charge-discharge circuit and the two charging power supplies, thereby further improving the efficiency of the uninterruptible power supply.

Taking the charging power supply of the bus capacitor as the first rectification circuit as an example, the control process of the uninterruptible power supply is described in detail below in combination with the structure shown in FIG. 8. Referring to FIG. 10, the control process of the uninterruptible power supply includes the following steps 1001 to 1007.

In step 1001, the relays K6 and K7 are switched on.

Referring to FIG. 8, when the relays K6 and K7 are on, the first rectification circuit is connected to the third capacitor C3. The AC outputted by the AC power supply is converted into DC by the diodes DI to D6, and then limited by the current limiting resistors R1 and R2, to charge the third capacitor C3.

In step 1002, it is determined whether the voltage across the third capacitor C3 is greater than or equal to the set voltage. If the voltage across the third capacitor C3 is greater than or equal to the set voltage, the method proceeds to step 1003. Otherwise, the method returns to step 1001.

In step 1003, the charge-discharge circuit is controlled to boost the voltage across the third capacitor C3 and charge the bus capacitor.

In step 1004, it is determined whether the voltage across the bus capacitor is equal to the first voltage. If the voltage across the bus capacitor is equal to the first voltage, the method proceeds to step 1005. Otherwise, the method returns to step 1003.

In step 1005, the relays K1 to K3 are switched on.

In step 1006, the charge-discharge circuit is controlled to stop charging the bus capacitor, and the relay K6 and the relay K7 are switched off.

Step 1007, the second rectification circuit is controlled to operate.

It should be noted that the control process of the uninterruptible power supply shown in FIG. 10 is applicable to only the structure of the uninterruptible power supply shown in FIG. 8. In practice, the control process of the uninterruptible power supply is adapted to the structure of the uninterruptible power supply, which is not listed herein.

In an exemplary embodiment, there is also provided a computer-readable storage medium containing instructions, e.g., a memory containing instructions. The instructions, when executed by the processor, perform the above method for controlling the uninterruptible power supply. Optionally, the storage medium is a non-transitory computer readable storage medium. For example, the non-transitory computer readable storage medium is a ROM, a random-access memory (RAM), a CD-ROM, a magnetic tape, a floppy disk, an optical data storage device, and the like.

In an exemplary embodiment, a computer program product is also provided. The computer program product includes a computer program. The computer program, when executed by the processor, implements the method of controlling the uninterruptible power supply according to the present application.

In an exemplary embodiment, various aspects of the method of controlling the uninterruptible power supply according to the present application are also implemented in the form of a program product. The program product includes program code. When the program product runs on the computer device, the program code is configured to control the computer device to perform the steps in the method for controlling the uninterruptible power supply according to various exemplary embodiments of the present application described above in this specification.

The program product may be in the form of any combination of one or more readable media. The readable medium is a readable signal medium or a readable storage medium. The readable storage medium is, for example, but not limited to, an electrical, magnetic, optical, electromagnetic, infrared, or semiconductor system, device, or apparatus, or any combination thereof. More specific examples (non-exhaustive list) of readable storage medium include: electrical connection with one or more conductors, a portable disk, a hard disk, a random access memory (RAM), read only memory (ROM), an erasable programmable read-only memory (EPROM or flash memory), an optical fiber, a portable compact disk read-only memory (CD-ROM), an optical storage device, a magnetic storage device, or any suitable combination of the above.

The program product of the method for controlling the uninterruptible power supply of the embodiment of the present application adopts a portable compact disk read only memory (CD-ROM) and includes program codes, and is executable on an electronic device. However, the program product of the present application is not limited thereto. In this document, a readable storage medium is any tangible medium that contains or stores a program. The program is used by or in conjunction with an instruction execution system, apparatus or device.

The readable signal medium includes a data signal that travels in baseband or as part of a carrier wave with readable program code carried therein. Such propagated data signals may be in many forms, including but not limited to electromagnetic signals, optical signals, or any suitable combination of the foregoing. The readable signal medium is also any readable medium other than a readable storage medium. The readable medium transmits, propagates or transports the program for use by or in connection with the instruction execution system, apparatus or device.

The program code embodied on the readable medium may be transmitted using any appropriate medium, including but not limited to wireless, wireline, optical fiber cable, RF, etc., or any suitable combination of the foregoing.

The program code for carrying out the operations of the present application is written in any combination of one or more programming languages. The programming language includes object-oriented programming languages such as Java, C++, etc., and also includes conventional procedural programming languages such as C language or similar programming languages. The program code may be executed on the user electronic device entirely, partially, as an independent software package, partly on the user electronic device and partly on a remote electronic device, or entirely on the remote electronic device or server. In cases involving a remote electronic device, the remote electronic device is connected to the user electronic device through any kind of network, including a local area network (LAN) or a wide area network (WAN). Alternatively, the remote electronic device is connected to the external electronic device (e.g., via the Internet provided by an Internet service provider).

It should be noted that although several units or subunits of the device are mentioned in the above detailed description, this division is only exemplary and not mandatory. Actually, according to the embodiment of the present application, the features and functions of two or more units described above are embodied in one unit. Alternatively, the features and functions of one unit described above are further divided to be embodied by a plurality of units.

In addition, while operations of the method of the present application are depicted in the drawings in a particular order, there is no requirement or implication that these operations must be performed in that particular order, or that all illustrated operations must be performed to achieve desirable results. Additionally or alternatively, some steps are omitted, some steps are combined into one step for execution, and/or one step is decomposed into multiple steps for execution.

The invention claimed is:

1. An uninterruptible power supply, comprising:
a first rectification circuit;
a charge-discharge circuit;
a bus capacitor;
a first switch circuit;
a second rectification circuit;
a battery pack;
a second switch circuit connected between the battery pack and the charge-discharge circuit, and configured to connect the battery pack to the charge-discharge circuit; and
a third switch circuit connected between the first rectification circuit and the charge-discharge circuit, and configured to connect the first rectification circuit to the charge-discharge circuit,
wherein the first rectification circuit is connected to the charge-discharge circuit, is configured for connecting to an alternating current power supply, and is configured to rectify a voltage outputted by the alternating current power supply and output a rectified voltage to the charge-discharge circuit,
wherein the charge-discharge circuit is connected to the bus capacitor, and is configured to charge the bus capacitor after boosting the rectified voltage outputted by the first rectification circuit until a voltage across the bus capacitor reaches a predetermined voltage greater than or equal to a peak voltage of the alternating current power supply, and
wherein the first switch circuit is connected to the second rectification circuit so as to be connected to the alternating current power supply, and is configured to connect the alternating current power supply to the second rectification circuit when the voltage across the bus capacitor reaches the predetermined voltage, such that the second rectification circuit supplies electric energy outputted by the alternating current power supply to a device connected to the bus capacitor.

2. The uninterruptible power supply according to claim 1, wherein,
the battery pack is connected to the charge-discharge circuit, and is configured to output stored voltage to the charge-discharge circuit, wherein the charge-discharge circuit is further configured to charge the bus capacitor after boosting the stored voltage outputted by the battery pack until the voltage across the bus capacitor reaches the predetermined voltage.

3. The uninterruptible power supply according to claim 2, further comprising:
a controller connected to the charge-discharge circuit and configured to control the charge-discharge circuit to charge the bus capacitor after boosting the stored voltage outputted by the battery pack or the voltage outputted by the first rectification circuit.

4. The uninterruptible power supply according to claim 3, wherein the controller is connected to the first switch circuit, the second switch circuit and the third switch circuit, and is configured to switch on the first switch circuit, the second switch circuit and the third switch circuit.

5. The uninterruptible power supply according to claim 1, further comprising:
a controller connected to the first switch circuit, the second switch circuit and the third switch circuit, and configured to switch on the first switch circuit, the second switch circuit and the third switch circuit.

6. The uninterruptible power supply according to claim 1, further comprising:
a voltage sensor connected to the bus capacitor and configured to measure the voltage across the bus capacitor.

7. The uninterruptible power supply according to claim 1, further comprising:
an inverter circuit connected to the bus capacitor and configured to convert the voltage across the bus capacitor into a power supply voltage for a downstream load, and supply power to the downstream load.

8. A power supply system, comprising:
a load;
the alternating current power supply; and
the uninterruptible power supply according to claim 1,
wherein the uninterruptible power supply is connected to the load and the alternating current power supply, and is configured to convert the voltage outputted by the alternating current power supply into a power supply voltage of the load and supply power to the load, and convert electric energy stored in the battery pack into a power supply voltage of the load and supply power to the load when the alternating current power supply malfunctions.

9. The power supply system according to claim 8, wherein,
the battery pack is connected to the charge-discharge circuit, and is configured to output stored voltage to the charge-discharge circuit, wherein the charge-discharge circuit is further configured to charge the bus capacitor after boosting the stored voltage outputted by the battery pack until the voltage across the bus capacitor reaches the predetermined voltage.

10. The power supply system according to claim 9, further comprising:
a controller connected to the charge-discharge circuit and configured to control the charge-discharge circuit to charge the bus capacitor after boosting the stored voltage outputted by the battery pack or the voltage outputted by the first rectification circuit.

11. The power supply system according to claim 10, wherein the controller is connected to the first switch circuit, the second switch circuit and the third switch circuit, and is configured to switch on the first switch circuit, the second switch circuit and the third switch circuit.

12. The power supply system according to claim 8, further comprising:

a controller connected to the first switch circuit, the second switch circuit and the third switch circuit, and configured to switch on the first switch circuit, the second switch circuit and the third switch circuit.

13. The power supply system according to claim 8, further comprising:

a voltage sensor connected to the bus capacitor and configured to measure the voltage across the bus capacitor.

14. The power supply system according to claim 8, further comprising:

an inverter circuit connected to the bus capacitor and configured to convert the voltage across the bus capacitor into a power supply voltage for a downstream load, and supply power to the downstream load.

15. A control method for an uninterruptible power supply, the uninterruptible power supply comprising; a first rectification circuit; a charge-discharge circuit; a bus capacitor; a first switch circuit; a second rectification circuit; a battery pack; a second switch circuit connected between the battery pack and the charge-discharge circuit, and configured to connect the battery pack to the charge-discharge circuit; and a third switch circuit connected between the first rectification circuit and the charge-discharge circuit, and configured to connect the first rectification circuit to the charge-discharge circuit, wherein the first rectification circuit is connected to the charge-discharge circuit, is configured for connecting to an alternating current power supply, and is configured to rectify a voltage outputted by the alternating current power supply and output a rectified voltage to the charge-discharge circuit, wherein the charge-discharge circuit is connected to the bus capacitor, and is configured to charge the bus capacitor after boosting the rectified voltage outputted by the first rectification circuit until a voltage across the bus capacitor reaches a predetermined voltage greater than or equal to a peak voltage of the alternating current power supply, and wherein the first switch circuit is connected to the second rectification circuit so as to be connected to the alternating current power supply, and is configured to connect the alternating current power supply to the second rectification circuit when the voltage across the bus capacitor reaches the predetermined voltage, such that the second rectification circuit supplies electric energy outputted by the alternating current power supply to a device connected to the bus capacitor, the method comprising:

controlling the charge-discharge circuit to charge the bus capacitor;

detecting the voltage across the bus capacitor;

switching on the first switch circuit when it is determined that the voltage across the bus capacitor reaches the predetermined voltage; and controlling the charge-discharge circuit to stop charging the bus capacitor, and controlling the second rectification circuit to operate.

16. The control method according to claim 15, wherein the controlling of the charge-discharge circuit to charge the bus capacitor comprises:

controlling the charge-discharge circuit to charge the bus capacitor after boosting a voltage stored in the battery pack; or controlling the charge-discharge circuit to charge the bus capacitor after boosting the rectified voltage outputted by the first rectification circuit.

17. The control method according to claim 16, further comprising:

charging an input capacitor until a voltage across the input capacitor reaches a set voltage before the controlling the charge-discharge circuit to charge the bus capacitor, if the input capacitor is disposed in the charge-discharge circuit and the voltage across the input capacitor is zero.

18. The control method according to claim 16, further comprising:

switching on the second switch circuit or the third switch circuit before the controlling the charge-discharge circuit to charge said bus capacitor; and switching off the second switch circuit or the third switch circuit after the controlling of the charge-discharge circuit to stop charging the bus capacitor.

* * * * *